United States Patent
Patidar (10) Patent No.: US 10,387,552 B2
(45) Date of Patent: Aug. 20, 2019

(54) MANAGING PORTABLE DOCUMENT-BASED WORKSPACES

(71) Applicant: ADOBE INC., San Jose, CA (US)

(72) Inventor: Mansukh Patidar, Greater Noida (IN)

(73) Assignee: Adobe Inc., San Jose, CA (US)

( * ) Notice: Subject to any disclaimer, the term of this patent is extended or adjusted under 35 U.S.C. 154(b) by 222 days.

(21) Appl. No.: 14/446,036

(22) Filed: Jul. 29, 2014

(65) Prior Publication Data

US 2016/0034435 A1 Feb. 4, 2016

(51) Int. Cl.
*G06F 17/00* (2019.01)
*G06F 17/24* (2006.01)
*G06F 16/958* (2019.01)

(52) U.S. Cl.
CPC ............ *G06F 17/24* (2013.01); *G06F 16/972* (2019.01)

(58) Field of Classification Search
CPC .......................... G06F 17/24; G06F 17/30011
See application file for complete search history.

(56) References Cited

U.S. PATENT DOCUMENTS

| 8,533,593 | B2 * | 9/2013 | Grossman | G06Q 10/103 |
| | | | | 715/255 |
| 8,914,900 | B2 * | 12/2014 | Smith | H04L 63/08 |
| | | | | 709/203 |
| 9,135,599 | B2 * | 9/2015 | Westerinen | G06Q 10/10 |
| 9,208,137 | B2 * | 12/2015 | Ginetti | G06F 17/24 |
| 2012/0096408 | A1 * | 4/2012 | Boss | G06Q 10/103 |
| | | | | 715/843 |
| 2013/0085811 | A1 * | 4/2013 | Darden | G06Q 10/00 |
| | | | | 705/7.38 |
| 2013/0205203 | A1 * | 8/2013 | MacDougall | G06F 17/241 |
| | | | | 715/256 |
| 2013/0212485 | A1 * | 8/2013 | Yankovich | G06F 9/4451 |
| | | | | 715/741 |

(Continued)

OTHER PUBLICATIONS

Terry, et al., "Recognizing Creative Needs in User Interface Design" C&C'02, Oct. 14-16, 2002, Copyright 2002 ACM, p. 38-44.*

*Primary Examiner* — Amelia L Tapp
(74) *Attorney, Agent, or Firm* — Shook, Hardy & Bacon, L.L.P.

(57) ABSTRACT

In various embodiments, methods and systems for managing portable document-based workspaces is provided. An indication to save a document-based workspace for a document is received on a computing device. The computing device can include a software application for editing the document and a client application for communicating with a cloud service component that is configured to store the document and the document-based workspace. Based on receiving the indication to save the document-based workspace, transient data associated with the document is identified. The transient data can be identified based on a data structure that defines document-specific data that are preserved as part of the document-based workspace. The document-based workspace is saved and communicated to the cloud service component such that the transient data associated with the document is accessible when the document is accessed from a second computing device that sends an indication to access the document and the document-based workspace.

20 Claims, 5 Drawing Sheets

(56) References Cited

U.S. PATENT DOCUMENTS

| | | | |
|---|---|---|---|
| 2013/0254699 A1* | 9/2013 | Bashir | G06F 3/0481 715/772 |
| 2013/0283207 A1* | 10/2013 | Dukhon | G06F 17/24 715/808 |
| 2014/0223278 A1* | 8/2014 | Gelman | G06F 3/0481 715/229 |
| 2015/0193100 A1* | 7/2015 | Strode | G06F 3/0484 715/765 |

\* cited by examiner

MANAGING PORTABLE DOCUMENT-BASED WORKSPACES

BACKGROUND

An electronic document generally refers to electronic media content used in electronic form. Software applications include one or more programs designed to provide access to carry out specific operations on electronic documents. Software applications can further facilitate editing electronic documents. Software applications support application preferences when editing documents. Software application preferences can be associated with a template document such that user configurations for that document are retrieved when the document is accessed for editing. Software application preferences, in this regard, are persistent because application preferences exist from session to session. Further, while editing data, software applications can create transient data that is associated with a document. Transient data, which is not available from session to session (i.e., not persistent data), can be important in preserving a document workspace for editing the document. Conventional software applications fail to provide ways for preserving document transient data and accessing document-based workspaces.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide methods and systems for managing portable document-based workspaces. An indication to save a document-based workspace for a document is received on a computing device. The computing device includes a software application for editing the document and can include a client application for communicating with a cloud service component that is configured to store the document and the document-based workspace. Based on receiving the indication to save the document-based workspace, transient data associated with the document is identified. The transient data may be identified, based on a data structure that defines transient data, from document-specific data that are preserved as part of the document-based workspace. The document-based workspace is saved and communicated to the cloud service component such that the transient data associated with the document is accessible when the document is accessed from a second computing device that sends an indication to access the document and the document-based workspace.

BRIEF DESCRIPTION OF THE DRAWINGS

The present invention is described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

An electronic document generally refers to electronic media content used in electronic form. Software applications include one or more programs designed to provide access to or carry out specific operations on electronic documents. Software applications can further facilitate editing electronic documents. Software applications support application preferences when editing documents. Software application preferences can be associated with a template document such that user configurations for that document are retrieved when the document is accessed for editing. Software application preferences, in this regard, are persistent in that application preferences exist from session to session. Further, while editing data, software applications can create transient data that is associated with a document. Transient data, which is not available from session to session, can be important in preserving a document workspace for editing the document. Conventional software applications fail to provide ways for preserving document transient data and accessing document-based workspaces. By way of example, a user working on a document may need to move from an office workstation to a home workstation to continue working on the document. When the user saves the document at his office workstation, the document workspace is not preserved, as such, when the user opens the document at his home workstation the document workspace is new.

Embodiments of the present invention provide simple and efficient methods and systems for managing portable document-based workspaces. At a high level, managing portable document-based workspaces comprises generating, saving, and accessing document-based workspaces. A document-based workspace refers to document-specific data that includes components and resources that facilitate editing a document in a software application. Often the document-specific data represent an editing state of the document at a given time, a snapshot.

Document-specific data can include persistent data and transient data. Persistent data refers to document editing data that outlives the editing process, in other words, data associated with the document that is preserved when the document is saved. Transient data refers to data in an opened document that is used in the editing process. Transient data is not persistent data, in that the transient data is not configured to outlive the process that created it. With embodiments of the present invention, transient data in an opened document is identified to be saved in association with a document-based workspace to preserve a snapshot of the editing process as a portable document-based workspace. Further, transient data can be different for particular software applications, as such, transient data associated with a particular application can be identified and selected to be preserved as part of a portable document-based workspace.

In operation, document-based workspaces are based on preserving identified transient data as a document is edited, such that, a document-based workspace can be generated, saved, and accessed from a different location at a different time. By of example, a document-based workspace can include transient data from document-specific data such as a document context, clipboard, selected objects, undo buffer, document locks, document preferences, and pointers to other documents. The transient data, which would otherwise be discarded, can be specifically identified and saved. The transient data may be saved as an independent file or saved as an integral portion of the document itself. A document-based workspace data structure can be defined to preserve the identified document-based workspace data for a workspace.

By way of example, a first user and a second user are part of a team collaborating on a document. The first user and the second user are located in different geographic locations and time zones. The first user and the second user work on the same document on a shared basis. The first user may define via a software application (e.g., a graphics editor application) a document editing state comprising a document context having color pallets, loaded brushes, and other document states. The document-based workspace can be used to save the document-specific data that define the document editing. The second user can open the document and corresponding document-based workspace and have access to the editing state saved via the document-based workspace. With embodiments of the present invention, the users can have both shared access to a document and also access to the document-based workspace associated with the document created by each user. As such, upon either user accessing the document, the document-based workspace is used to reestablish document-specific data that provides a snapshot of the editing process within the software application.

Transient data from document-specific data can include document context, clipboard, selected objects, undo buffer, document locks, document preferences, and pointers to other documents that when preserved in document-based workspaces in embodiments of the present invention facilitate portability of the document-specific data. For example, an undo buffer may be transient data associated with a document editing state of a software application. A data structure defines the undo buffer as document-specific data that should be preserved as part of the document-based workspace. As such, the user upon opening the document on any computer can recover the document editing state.

In another exemplary scenario, a user editing a document on a graphics editor software application on a first computing device may use a pen tool to create a path selection. The first computing device may be at a first location (e.g., a desktop at work). The selection will not be saved as part of saving the document upon completing the editing of the document. The selection does exist as transient data in the editing state of the software application. When the user has completed editing the document, the user can save the document-based workspace that saves the path selection. The user can upload the saved document and corresponding document-based workspace to the cloud. The user can access, from the cloud, the document and the corresponding document-based workspace on a second computing device running the graphics editor software. The second computing device may be at a second location (e.g., a laptop at home). Upon accessing the document, the corresponding document-workspace can be used to reestablish the editing state of the document to the graphics editor software application running on the second computing device.

In one embodiment, managing portable document-based workspaces can be facilitated by a cloud-based infrastructure. The cloud-based infrastructure may include several different client-side and cloud-side components that facilitate managing portable document-based workspaces using the cloud. The cloud-side components can communicate with client-side components to receive, store, and communicate the document-based workspace. In particular, users are be able to save a document associated with a document-based workspace using a client application on a computing device and access the document along with the document-based workspace from another computing device having the client-side components.

Embodiments of the present invention support generating a document-based workspace. The document-based workspace can be generated via an interface of a software application that provides access to the document. Another client application or service can also be used to facilitate generating the document-based workspace. A user editing a document can be provided with several different interface prompts that facilitate saving a document and an associated document-based workspace of the document. For example, an interface may provide the user the option to save the document-based workspace when the user attempts to save the document. It is also contemplated that the document-based workspace can be automatically saved when saving a document. Specific application configuration settings may further dictate interface elements and prompts options that are used to save the document-based workspace.

The document-based workspace can be generated based on a document-based workspace data structure. The data structure provides a particular way for organizing the data associated with a document-based workspace. For example, the data structure can be defined as an object having data fields and code for accessing and saving transient data associated with the document when a document-based workspace in selected to be saved. In particular, the data structure comprises document context, clipboard, selected objects, undo buffer, document locks, document preferences, and pointers to other documents. A document context, in particular, can include various applications states including color pallets, loaded brushes, and other document configurations via the software application. The data structure can include specific data fields such as a computing device identifier, timestamp, and source information (e.g., computing device, device, user id, device id) of the computing device running the application, such that, the data fields are populated with the corresponding information stored in association with the document-based workspace.

Different elements of the data structure may be associated with specific data types and information. For example, a document can include a data field for a document type, the location of document (e.g., cloud or local) and the path of the document. Elements such as undo history and clipboards may be associated with data blobs, and user selections can be associated with selections paths. The different elements of the document-based workspace data structure defined herein are not meant to be limiting but merely exemplary, as such, other variations and combinations of data structure elements are contemplated with embodiments of the present invention.

With a data structure defined for the document-based workspace, the workspace can be saved. Saving the document-based workspace may be facilitated by a cloud-based infrastructure having client-side components and cloud-side components. The client-side components include the software application that may provide an interface for saving the workspace. It is contemplated that the software application may identify, in allocated memory of the software application, transient data that would otherwise not be saved, such that a portable document-based workspace is generated and saved. Identifying the transient data in memory can be based on the elements defined in the data structure. The software application may save the document-based workspace separately or as an integral portion of the document itself. How the workspace is saved and managed can be based on configurable features of the cloud-based infrastructure and/or the software application in particular.

The cloud-based infrastructure may also support a client-side component (e.g., client service) that is a resident application or service on a computing device that is used to facilitate saving the portable document-based workspace. The client service may be distinct from the software application used to edit the document, or integrated with the software application. The client service can, in particular, provide access to cloud-based components of the cloud-based infrastructure such that saved document-based workspace can be communicated and stored in cloud storage. In this regard, the software application can support saving a portable document-based workspace locally on the computing device and a client service can facilitate communicating the document-based workspace to the cloud.

In embodiments, the documents and document-based workspaces may be processed independently of each other. Independent processing of the documents and document-based workspaces may be facilitated by a linking mechanism (e.g., pointers) to align documents with their corresponding document-based workspace. Documents may be saved to a sync folder associated with the client service that syncs the documents to cloud storage. The workspaces are transferred to the client application directly from a software application to be communicated to cloud storage. In embodiments, the cloud computing infrastructure storage component may implement separate services to facilitate storing workspaces independently of documents. However, documents and workspaces may also be processed in combination in certain embodiments, as such, any other variations and combinations of processing documents and their associated workspaces are contemplated with embodiments of the present invention. It is also contemplated that local storage devices (e.g., USB stick) can be used to store workspaces such that the workspace is accessible from a secondary computing device via the storage device.

A document-based workspace is portable in that the workspace is accessible from a secondary computing device. The transient data of a user's workspace that is saved as a portable document-based workspace can be provided when the document is opened at the secondary computing device. The cloud-based infrastructure can facilitate accessing the document and the associated document-based workspace. By way of example, a user at the secondary computing device may access the software application and open the document via cloud storage, such that, the document is opened along with the corresponding document-based workspace. The software application can provide interface elements that support accessing and opening a document that is specifically associated with a document-based workspace. For example, the interface can include specific prompts that direct the user to open an associated document-based workspace of a document, or in the alternative, the interface may automatically detect an associated document-based workspace and open the document-based workspace. Other variations and combinations of interface elements for retrieving and opening the document and the associated workspace are contemplated with embodiments of the present invention.

The software application can work with the client application that provides access to cloud-based components of the infrastructure. In embodiments, the cloud-based components may include separate services that independently handle processing document-based workspaces and documents. The document-based workspaces and documents may be accessed from the software application on any device to retrieve the document and the specific document-based workspace having transient data of the document at the time the document was being edited. Providing the document-based workspace with a software application may include configuring interface features (e.g., graphical interface or peripheral interface) of the software application based on the document-based workspace to provide the previously saved workspace interface features. For example, path selections, color palettes, or loaded brushes in a graphics editing software can be automatically reloaded, while a keyboard shortcut or touchscreen button associated with document-specific data can be provided as part of the document-based and accessed using the interface features.

At a high level, embodiments of the present invention provide document-based workspaces having selected transient data that are preserved while document is being edited. The transient data, identified using a document-based workspace data structure, defines data associated with editing the document in software application. The transient data are not automatically deleted as they would otherwise have been if the document is not saved as a portable document-based workspace, but instead the transient data are saved and made accessible as a portable document-based workspace via the cloud.

Accordingly, in a first aspect of the present invention, one or more computer storage media storing computer-useable instructions that, when used by one or more computing devices, causes the one or more computing devices to perform a method for managing portable document-based workspaces is provided. The method includes receiving an indication to save a document-based workspace for a document. The method also includes identifying transient data associated with the document. The method further includes saving the document-based workspace such that the transient data associated with the document is accessible when the document accessed.

In a second aspect of the present invention, a computer-implemented method suitable for use in a distributed computing environment utilizing a processor and a memory for managing portable document-based workspaces is provided. The method includes receiving a document and a document-based workspace. The document-based workspace comprises transient data associated with editing the document.

The method includes storing the document and the document-based workspace. The method also includes receiving an indication to communicate the document and the document-based workspace to a computing device. The method further includes communicating the document and document-based workspace to the computing device.

In a third aspect of the present invention, a system for managing portable document-based workspaces is provided. The system includes a software application configured for: receiving an indication to save a document-based workspace for a document; identifying transient data associated with the document; and saving the document-based workspace such that the transient data associated with the document is accessible when the document accessed. The system also includes a client service component configured for: uploading the document and the document workspace; and downloading the document and the document workspace. The system includes a cloud service component configured for: receiving the document and the document-based workspace; storing the document and the document-based workspace; receiving an indication to communicate the document and the document-based workspace; and communicating the document and document-based workspace.

Figure 1:
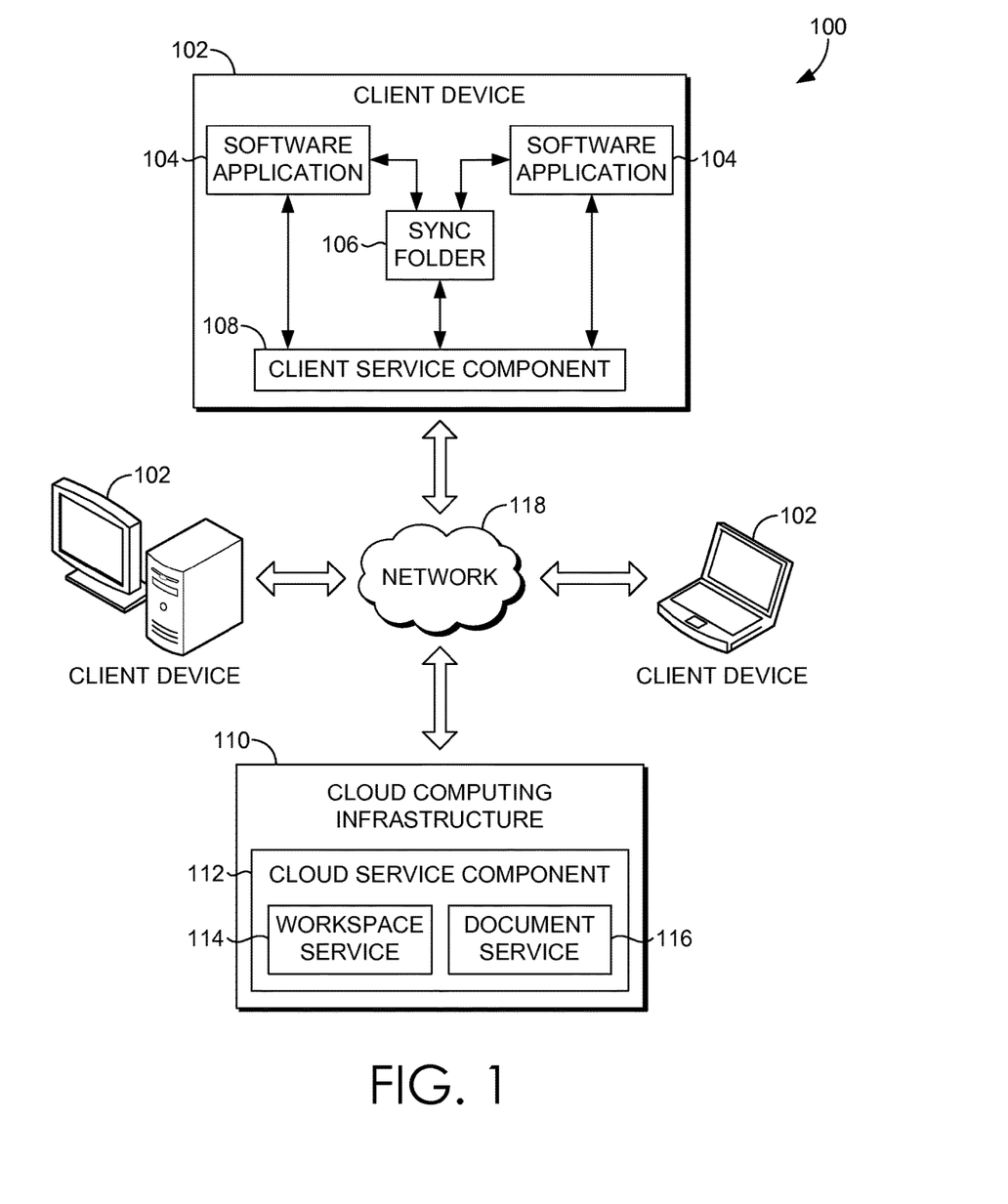
FIG. 1 is a block diagram showing a system for managing portable document-based workspaces in accordance with embodiments of the present invention.

Turning now to FIG. 1, an example embodiment of a high-level cloud-based infrastructure (hereinafter "infrastructure" 100) in which embodiments of the present invention may be performed is shown. The infrastructure 100 shown in FIG. 1 is an example of one suitable infrastructure. The infrastructure 100 should not be interpreted as having any dependency or requirement related to any single module/component or combination of modules/components illustrated therein. Each may comprise a single device or multiple devices cooperating in a distributed environment. For instance, components may comprise multiple devices arranged in a distributed environment that collectively provide the functionality described herein. Additionally, other components not shown may also be included within the network environment.

With reference to FIG. 1, the infrastructure 100 may include client devices 102, software applications 104, a sync folder 106, a client service component 108, a cloud computing infrastructure 110 having a cloud service component 112, a workspace service 114, a document service 116, and a network 118. The network 118 may include, without limitation, one or more local area networks (LANs) and/or wide area networks (WANs). Such networking environments are commonplace in offices, enterprise-wide computer networks, intranets and the Internet. Accordingly, the network is not further described herein.

Any number of client devices and cloud computing infrastructures may be employed in the computing system 200 within the scope of embodiments of the present invention. Each may comprise a single device/interface or multiple devices/interfaces cooperating in a distributed environment. For instance, the cloud computing infrastructure 110 may comprise multiple devices and/or modules arranged in a distributed environment that collectively provide the functionality of the managing portable document-based workspaces described herein. Additionally, other components/modules not shown also may be included within the infrastructure 100.

It should be understood that this and other arrangements described herein are set forth only as examples. Other arrangements and elements (e.g., machines, interfaces, functions, orders, and groupings of functions) can be used in addition to or instead of those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 5:
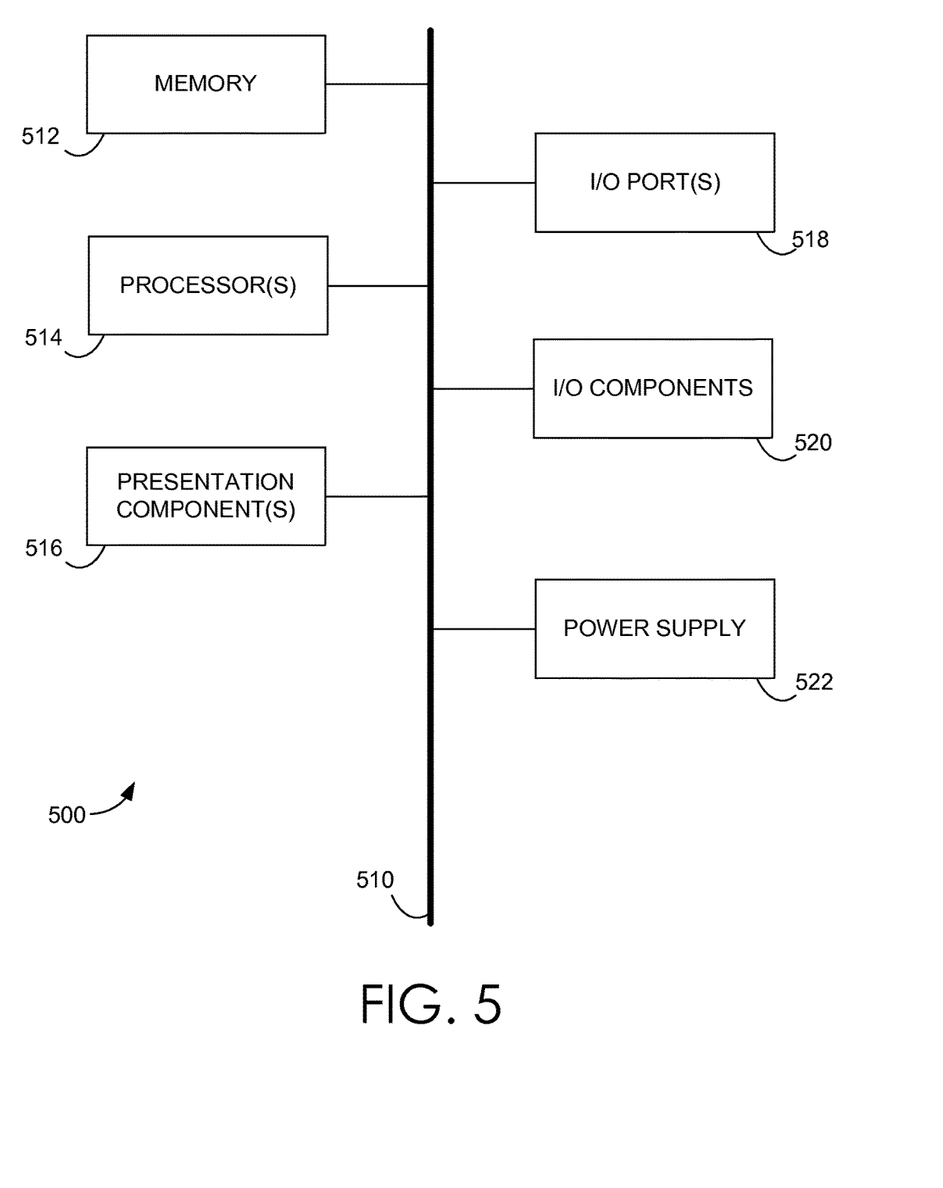
FIG. 5 is a block diagram of an exemplary computing environment suitable for use in implementing embodiments of the present invention.

The client device 102 may include any type of computing device 500 described below with reference to FIG. 5, for example. The client device 102 may be associated with different applications, for instance, a software application (e.g., software application 104) on the client device 102. Client device 102 is responsible for running client-side components in accordance with embodiments of the present invention. The client device 102 can implement a sync folder 106 and client service component 108 that facilitate managing document-based workspaces. In particular, the client device 102 can facilitate communication with cloud-side components of the present invention. The above-described configuration of the client device 102 is merely exemplary and not intended to limit embodiments of the present inventions.

Software application 104 facilitates generating, saving, and accessing document-based workspace. The software application 104 is responsible for generating document-based workspaces based on document transient data. The software application 104 is configured to receive an indication to save a document-based workspace for a document. Receiving the indication to save a document-based workspace may be based on several different interfaces and workflows. For example, a user can use interface features of the software application 104 to save and document which automatically saves document-based workspace of the document. In an alternative implementation, the interface includes specific prompts which the user responds to in order to save the document-based workspace along with the document. It is also contemplated that via an interface feature of the software application 104, a user may send an indication to save a particular document-based workspace for a snapshot in time. As such, the software application 104 can be associated with different configurable settings and interface features for generating the document-based workspace.

The software application 104 further generates the document-based workspace based on identifying transient data associated with the document. The software application 104 can be associated with a data structure that that defines document-specific data that are preserved as part of the document-based workspace. In particular, several elements of a documents being edited can be transient data. Transient data may include data associated with a document that is temporarily stored in memory associated with the software application. Elements of a document during editing can include a document context, a clipboard, a selected object, an undo buffer, a document lock, a document preference, and a pointer to other documents amongst other elements. With embodiments of the present invention, transient data associated with these elements that would otherwise be discarded, usually upon saving and/or closing a document, can be preserved and communicated such that a document workspace associated with the document is maintained.

It is contemplated that the document and the document-based workspace may be generated as independent files and managed separately with some linking mechanism to have a document correspond to an associated document-based workspace. The linking mechanism may be a pointer between the document and the document-based workspace that keeps the two related. Other linking mechanisms are contemplated with embodiments of the present invention. The software application 104 may also generate a document-based workspace that is an integral portion of the document itself. In this regard, the document and the document-based workspace can be managed and processed in combination with each other.

The software application 104 is further configured to save the document-based workspace. The software application 104 may save the document-based workspace on a local storage device or an external storage device. The document-based workspace is saved such that the transient data associated with the document is accessible when the document accessed. In embodiments, the software application communicates with the client service component 108 to transfer the document-based component to the cloud computing infrastructure 110.

In one embodiment, the software application 104 can manage the document and the document-based workspace separately. For example, the software application 104 and at least one other software application can share a sync folder (e.g., sync folder 106) for saving the documents associated with each corresponding application. The sync folder 106 works with the client service component to upload the documents to the cloud computing infrastructure 110. The software application 104 can also communicate the document-based workspaces directly to the client service component 108. The client service component 108 can also upload the document-based workspaces to the cloud computing infrastructure 110.

The client service component 108 is responsible for communicating documents and document-based workspaces. In particular, the client service component 108 can receive documents and document-based workspaces from software application 104 and upload the documents and the document-based workspaces to the cloud computing infrastructure 110. The client service component 108 provides access to the cloud computing infrastructure such that the document-based workspace is saved in the cloud and the document-based workspace is accessible from a second computing device that is different from the computing device used to generate the document and the document-based workspace.

The client service component 108 may also provide an interface for managing the different documents and document-based workspaces. The interface can provide a unified view of documents and their corresponding workspaces. The view can identify the software applications associated with respective documents and the document-based workspaces. The client interface may be further configured to show details of the document-based workspace. The details can include the types of information (e.g., transient data) preserved with a particular document and software application. It is contemplated that the client service can provide a configuration interface for selecting and deselecting individual document-specific data that may can part of the document-based workspace. In this regard, the client service can provide specific details of the document workspace and provide an interface for changing and configuring how the document-based workspaces are created and communicated.

The client service component 108 may also implement a user account model, where individual users and/or groups of users are associated with accounts and documents and document workspace in their accounts. With access to the documents and their corresponding workspaces, a user can select which documents to upload to the cloud computing infrastructure or download to the client device, as discussed in more detail below.

With continued reference to FIG. 1, the cloud computing infrastructure 110 acts to store data or run service applications in a distributed manner. A cloud computing infrastructure may span wide geographic locations, including countries and continents. The service-application components of the cloud computing system may include nodes (e.g., computing devices, processing units, or blades in a server rack) that are allocated to run one or more portions of a service application. When more than one separate service applications are being supported by the nodes, the nodes may be partitioned into virtual machines or physical machines that concurrently run the separate service applications, respectively, in individualized computing environments that support the resources and/or operating system specific to each service application. Further, each service application may be divided into functional portions such that each functional portion is able to run on a separate virtual machine.

The cloud computing infrastructure 110 comprises a cloud service component 112 having a workspace service 114 and a document service 116. The cloud service component 112 is responsible for managing portable document-based workspaces in the cloud. The cloud service component provides storage of software application documents and corresponding document-based workspaces. The cloud service component 112 receives uploads from a client service component on a client device in order to store the documents and the document-based workspaces. The cloud service component 112 may perform functions similar to the client service component via the cloud. The cloud service component can provide a cloud-based interface for managing the documents and the corresponding document-based workspaces for the documents. The cloud service component may support a user account model for accessing documents and document-based workspaces associated with individual users and groups of users working in collaboration. The cloud service component 112 by manage access permissions to certain documents and document-based workspaces.

In embodiments, the cloud service component 112 can manage the documents and the document-based workspaces independently or in combination. When the documents and the document-based workspaces are managed independently, the cloud service component can implement a workspace service 114 and a document service 116. The workspace service manages the document-based workspaces and the document service manages the documents. Managing the documents and workspaces may include providing an interface for interacting with the documents and workspaces and providing other informational interface elements. For example, the documents may be presented with an interface feature to distinguish documents with associated workspace and documents without workspaces. Documents and workspaces may also be arranged and sorted based on document detail information including the associated software application, users, modified data etc. As such, other variations and combination of interface features and document management techniques are contemplated with embodiments of the present invention.

The client service component 112 is responsible for providing access to documents and corresponding document-based workspaces from client devices. By way of example, a user may use a software application of a first computing device and save the document along with a document-based workspace. The client-side components on the client device may facilitate uploading the document and the document-based workspace into the cloud computing infrastructure 100. A user may access the software application either on the same computing device or a second computing device different from the first computing and still have the document-based workspace.

In operation, the software application 102 may provide access to the cloud computing infrastructure 110 via the client service component. Several different types of interfaces and prompts are contemplated for retrieving the document and the document-based workspace. For example, the user may open the software application attempt to open the document via a direct interface to the cloud computing infrastructure 110. The indication to open the document may trigger downloading the document and the associated document-based workspace; thus providing access to the document. In an alternate embodiment, the client service component 108 may provide an interface to the cloud computing infrastructure 110 to download one or more documents and their corresponding document-based workspaces. Upon download, a user may access the file using conventional document launching methods, however the software application further opens the document with a corresponding document-based workspace. In embodiments, certain interface features of the software application may be updated based on particular elements of the document-based workspaces that change a generic interface. For example, document context (e.g., loaded brushes, color pallets) details are provided via interface features, and as such, the document-based workspace can alter interface features when an associated document is opened.

Figure 2:
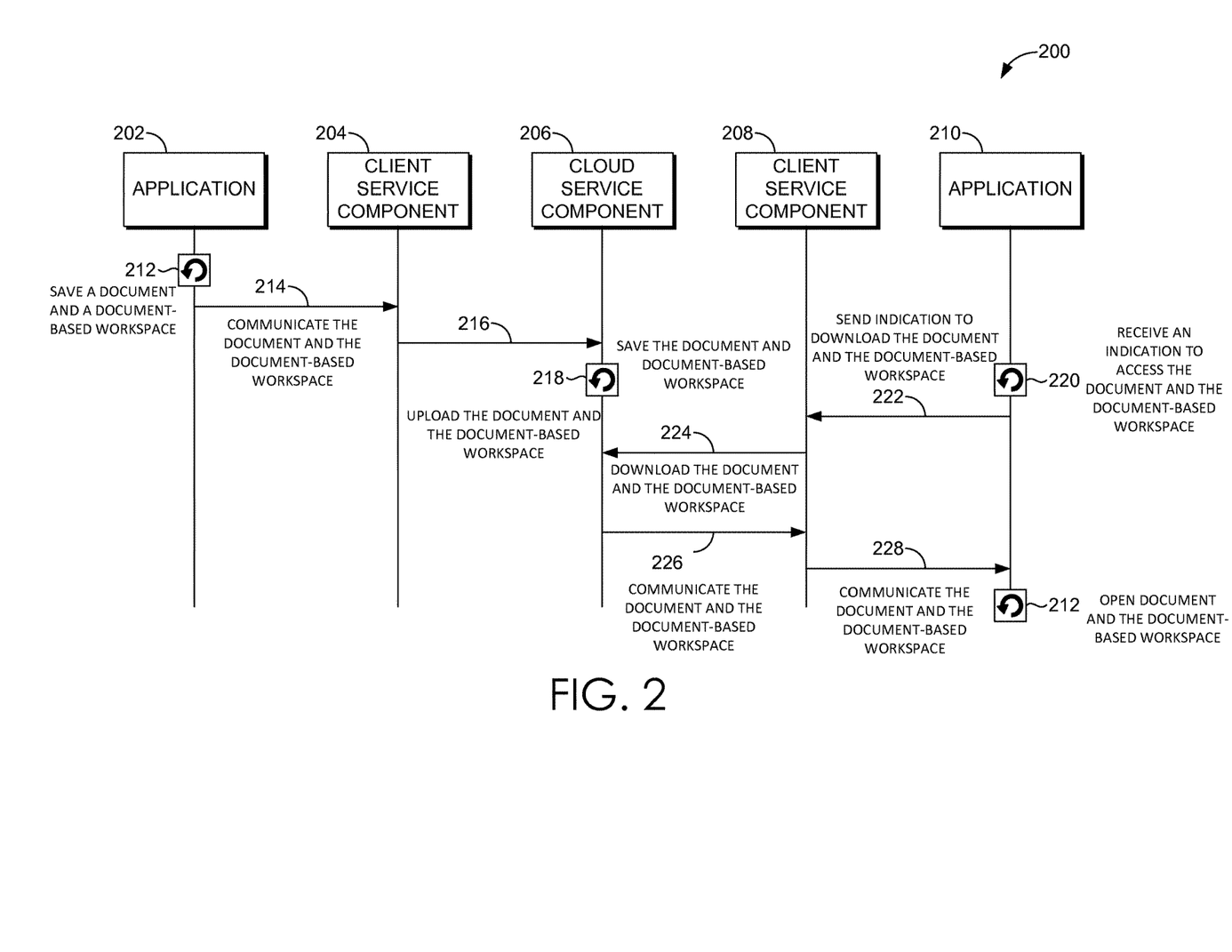
FIG. 2 is schematic diagram showing a method for managing portable document-based workspaces in accordance with embodiments of the present invention.

With reference now to FIG. 2, a schematic diagram 200 is provided that illustrates a method 200 for managing portable document-based workspaces in accordance with an embodiment of the present invention. The operating environment includes an application 202, client service component 204, cloud service component 206, and client service component 208 and application 208. In particular, application 202 and client service component 204 may be on a computing device and application 210 and client service component 208 may be on another computing device. It is possible for the method described herein to be performed on the same computing device accessing its own previously saved document and document-based workspace.

Initially at step 212, the application 202 may receive an indication to save a document and a document-based workspace. Saving the document and the document-based workspaces is based on preserving transient document workspace data as a document is edited such that a workspace can be generated, saved, and accessed from a different computing device and a different time. The document-based workspace data comprises a document context, clipboard, selected objects, undo buffer, document locks, document preferences, and pointers to other documents. At step 214, the application may communicate the document and the document-based workspace to a client service component 204. The client service component 204 is responsible for providing access to documents and corresponding document-based workspaces from client devices. In particular, as shown at step 216, the client service component uploads the document and the document-based workspace. Uploading the document and the document workspace may be automated and performed periodically, but is may also be manually uploaded to a cloud computing infrastructure.

The cloud computing infrastructure acts to store data or run service applications in a distributed manner. The cloud computing infrastructure implements the cloud service component 206 that is responsible for managing the document-based workspaces in the cloud computing infrastructure. As shown at step 218, the cloud service component 206 can save the document and document-based workspace. It is contemplated the cloud service component can either manage the document and document-based workspace independently or in combination.

At step 220, the application 210 may receive an indication to access the document and the document-based workspace. Several different interfaces and prompts are contemplated with embodiments of the present invention on how a user retrieves a document and document-based workspace. In one embodiment, the application 210 provides an interface that presents a selectable document and document-based workspace which automatically downloads the document from the cloud computing infrastructure and opens the document with the corresponding document-based workspace. Also as shown at step 222, the application 210 may send an indication to download the document and the document-based workspace to the client service component 208. The client service component 208 at step 224 downloads the document and the document-based workspace.

At step 226, the cloud service component 206 communicates the document and document-based workspace to the client service component 208 based on receiving a communication from the client service requesting to download the document and the document-based workspace. Upon receiving the document and document-based workspace, at step 228 the client service component 208 communicates the document and document-based workspace to the application 210. The application 210 can open the document and the document-based workspace. Accessing the document-based workspace with application 210 may include configuring interface features (e.g., graphical and peripheral interface features) of the application based on the document-based workspace to provide the previously saved workspace interface features. In general, the transient data of the document that define the workspace during editing of a document with application 202 is not automatically deleted as it would otherwise have been when a document is saved without its associated workspace. As such, transient data is saved at by application 202 and is made accessible as a document-based workspace via the cloud.

Figure 3:
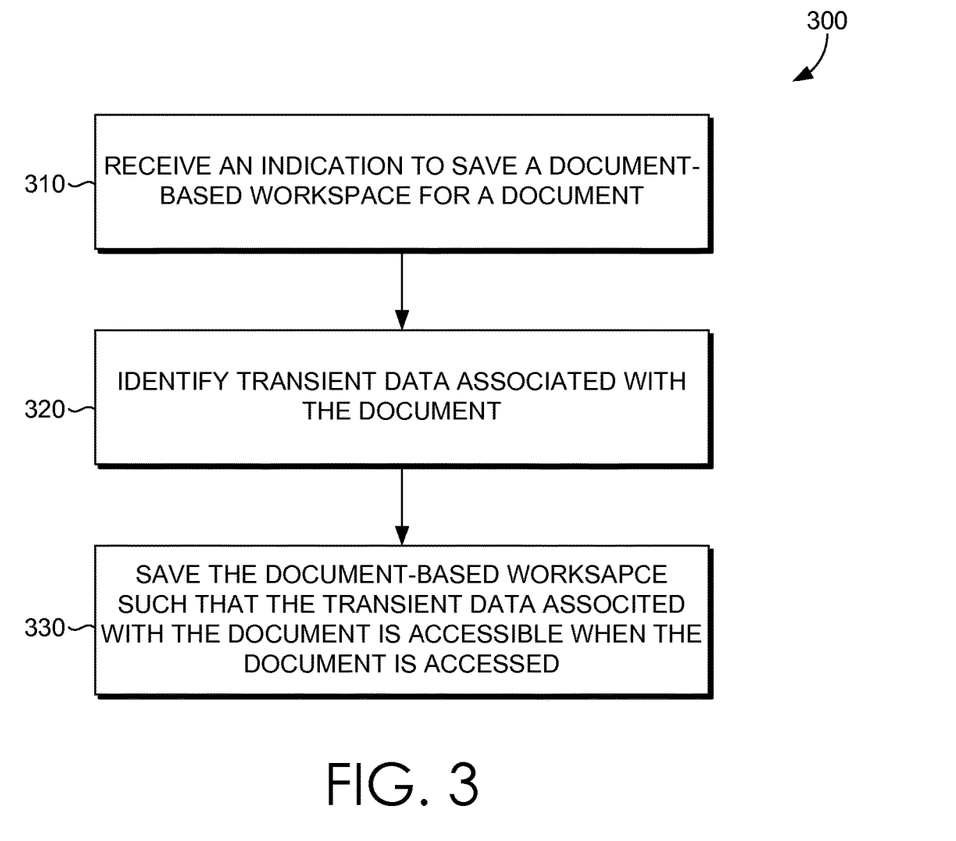
FIG. 3 is a flow diagram showing a method for managing portable document-based workspaces in accordance with embodiments of the present invention.

With reference now to FIG. 3, a flow diagram 300 is provided that illustrates a method 300 for managing portable document-based workspaces in accordance with an embodiment of the present invention. Each block of the method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Initially at block 310, an indication to save a document-based workspace for a document is received. For example, a user working on a software application can send an indication to the software application to save a document-based workspace. The indication can be based on an indication from the user to save the document that also triggers an indication to save the document-based workspace. At block 320, transient data associated with the document is identified. When creating or editing a document, transient data may be stored in an allocation of memory for the software application. Transient data includes data that would otherwise be discarded, usually upon saving and/or closing a document. In this regard, transient data can preserved and communicated such that a document workspace associated with the document is maintained. The software application may be associated with a data structure that that defines document-specific data that are preserved as part of the document-based workspace. At block 330, the document-based workspace is saved such that the transient data associated with the document is accessible when the document accessed.

Figure 4:
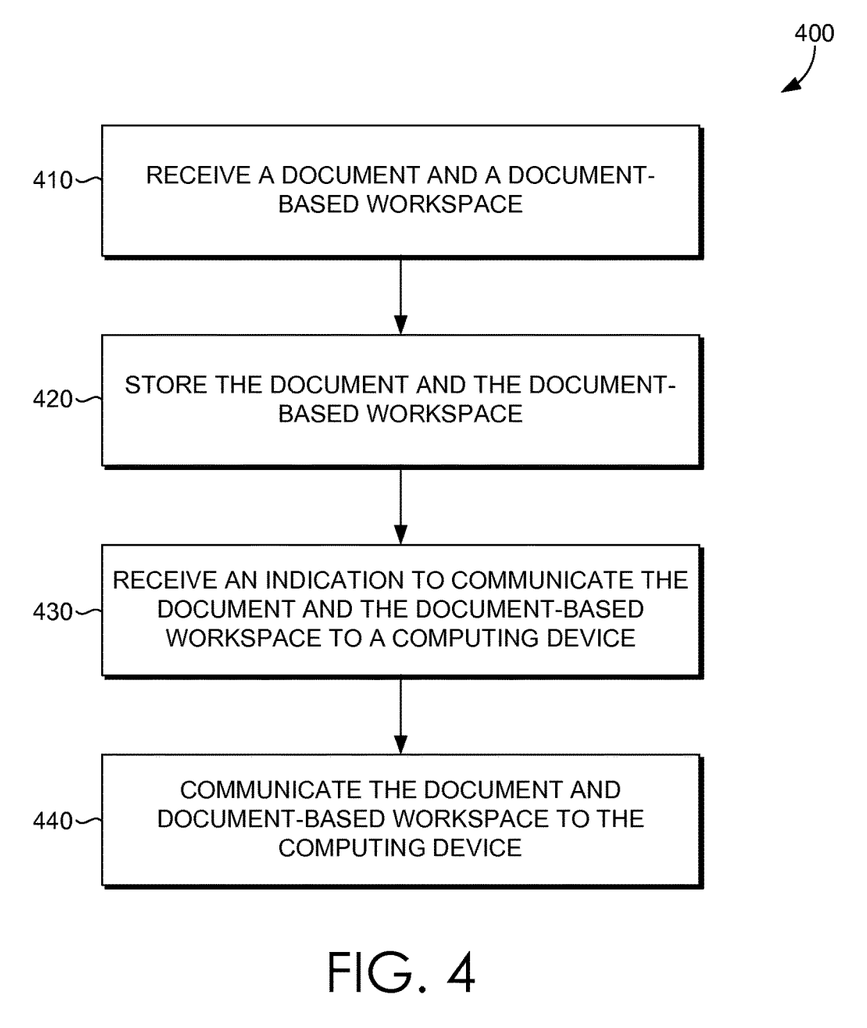
FIG. 4 is a flow diagram showing a method for managing portable document-based workspaces in accordance with embodiments of the present invention.

With reference now to FIG. 4, a flow diagram 400 is provided that illustrates a method 400 for managing portable document-based workspaces in accordance with an embodiment of the present invention. Initially at block 410, a document and a document-based workspace is received. The document-based workspace comprises transient data associated with editing the document. The document and document-based workspace can be received at cloud computing infrastructure that facilitates managing the document and document-based workspace. The document and document-based workspace may be managed independently or managed in combination when the document-based workspace is an integral portion of the document. At block 420, the document and the document-based workspace are stored. The cloud computing infrastructure comprises storage for the document and document-based workspace such that the document and document-based workspace can be accessed from a plurality of computing devices.

At block 430, an indication to communicate the document and the document-based workspace to a computing device is received. For instance, a user may save a document and a corresponding document-based workspace at first computing device and a client service at the first computing device uploads the document and the document-based workspace to a cloud computing infrastructure for storage. The user can then send an indication from a second computing device to access the document and the corresponding document-based workspace on a cloud computing infrastructure. The cloud computing infrastructure can retrieve the document and the document-based workspace and communicate the document and document-based workspace to the second computing device. At the second computing device, the document is opened along with the document-based workspace that was previously saved on the first computing device.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc. I/O ports 518 allow computing device 500 to be logically coupled to other devices including I/O components 120, some of which may be built in. Illustrative I/O components 520 include a microphone, joystick, game pad, scanner, hard/soft button, touch screen display, etc.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. One or more computer storage media storing computer-useable instructions that, when executed by one or more processors, cause the one or more processors to perform a method for managing portable document-based workspaces, the method comprising:
   receiving an indication to execute a save document operation to save a document for a software application;
   triggering an indication to save a document-based workspace for the document, the document associated with persistent data and transient data, wherein the persistent data is document-specific data configured to be preserved upon saving documents, and the transient data is document-specific data configured to not be saved upon saving documents;
   prior to executing the save document operation that does not save the transient data, identifying the transient data associated with the document to save as part of the document-based workspace;
   saving the document-based workspace in association with the document such that the transient data associated with the document is accessible when the document is accessed; and
   executing the save document operation.

2. The media of claim 1, wherein the document-based workspace comprises document-specific data that includes components and resources that facilitate editing the document in the software application, wherein the document-specific data represents an editing state of the document at a given time.

3. The media of claim 2, wherein the document-specific data comprises the transient data identified to be saved to preserve a snapshot of an editing process of the document, wherein the transient data comprises at least one of document context, clipboard, selected objects, undo buffer, document locks, document preferences, and pointers to other documents.

4. The media of claim 1, wherein identifying the transient data associated with the document is based on a data structure that defines transient data from the document-specific data that are preserved as part of the document-based workspace.

5. The media of claim 1, further comprising:
providing a configuration interface for the document-specific data; and
receiving a selection or de-selection of individual element types of document-specific data that are part of the document-based workspace.

6. The media of claim 1, wherein the document and the document-based workspace are processed independently of each other.

7. The media of claim 1, wherein the document-based workspace is an integral portion of the document.

8. The media of claim 1, wherein saving the document-based workspace further comprises:
communicating the document-based workspace to a client application such that document-based workspace is communicated and saved in a cloud computing infrastructure storage component.

9. A computer-implemented method suitable for use in a distributed computing environment utilizing a processor and a memory for managing portable document-based workspaces, the method comprising:
receiving a document and a document-based workspace associated with a software application, wherein the document is associated with persistent data and transient data, wherein the persistent data is document-specific data configured to be preserved upon saving documents and the transient data is document-specific data configured to not be saved upon saving documents;
storing the document and the document-based workspace to preserve a snapshot of the document, wherein the document is stored upon receiving an indication to execute a save document operation to save the document,
wherein the document-based workspace includes identified transient data associated with the document for the software application,
wherein the transient data is identified and saved, in association with the document-based workspace, prior to executing the save document operation that does not save the transient data;
receiving an indication to communicate the document and the document-based workspace to a target computing device; and
communicating the document and document-based workspace to the target computing device.

10. The method of claim 9, wherein the document and document-based workspace are stored independently of each other in a cloud computing infrastructure storage component.

11. The method of claim 9, further comprising:
a source computing device that comprises the software application, wherein the software application generates the document-based workspace, and wherein the source computing device and the target computing device each comprise a client application, wherein the client application manages communication, between the software application and a cloud computing storage infrastructure component, of the document and the document-based workspace.

12. The method of claim 9, wherein the document and the document-based workspace are received at the target computing that is different from the source computing device, the source computing device is used to create the document and the document-based workspace on the software application running on the source computing device, and the target computing device is used to access the document and the document-based workspace on the software application running on the target computing device.

13. The method of claim 12, wherein accessing the document and the document-based workspace on the software application running on the target computing device comprises configuring interface features of the software application running on the target computing device based on the document-based workspace to provide the previously saved workspace interface features.

14. The method of claim 13, wherein the interface features include at least one of a graphical user interface or a peripheral interface.

15. The method of claim 12, wherein accessing the document and the document-based workspace on the software application running on the target computing device further comprises:
receiving, at the target computing device, an input from a user to undo an action performed on the source computing device;
undoing the action at the target computing device; and
rendering the document at the target computing device upon undoing the action.

16. A system for managing portable document-based workspaces, the system comprising:
a processor and a memory configured for providing computer program instructions to the processor;
a software application on a first computing device configured for:
receiving an indication to execute a save document operation to save a document for a software application;
triggering an indication to save a document-based workspace for the document, the document including persistent data and transient data, wherein the persistent data is document-specific data configured to be preserved upon saving documents and the transient data is document-specific data configured to not be saved upon saving documents;
prior to executing the save document operation that does not save the transient data, identifying the transient data associated with the document to save as part of the document-based workspace, wherein identifying the transient data associated with the document is based on a data structure that defines transient data that is directly selectable to be preserved as part of the document-based workspace;
saving the document-based workspace in association with the document such that the transient data associated with the document is accessible when the document accessed; and
executing the save document operation;

a cloud service component configured for:
receiving the document and the document-based workspace;
storing the document and the document-based workspace;
receiving an indication to communicate the document and the document-based workspace; and
communicating the document and document-based workspace; and a software application on a second computing device configured for:
sending an indication to retrieve document-based workspace for a document; and
reestablishing an editing state of the document using the document-based workspace.

17. The system of claim 16, further comprising:
the software application on the first computing device configured for:
receiving an input from a user to execute an action associated with a document, wherein the action creates transient data of the software application on the first computing device, the transient data is associated with the editing state of the document;
saving the transient data in the document-based workspace;
the software application on the second computing device configured for:
retrieving the document-based workspace having the transient data, wherein the transient data is used to reestablish the editing state of the document;
receiving an indication to perform a second action associated with the transient data; and
performing the second action based on the transient data and the reestablished editing state of the document.

18. The method of claim 17, wherein the transient data comprises at least one of document context, clipboard, selected objects, undo buffer, document locks, document preferences, and pointers to other documents preserved on the first computing device that are accessible via the document-based workspace on the second computing device.

19. The system of claim 16, wherein transient data is identified based on:
retrieving the data structure that defines the transient data from document-specific data for the software application, the document-specific data representing an editing state of the document at a given time, wherein the data structure is specifically generated based on the transient data of an opened document in the software application; and
identifying the transient data using the data structure such that the transient data is selected to be preserved as part of the document-based workspace.

20. The system of claim 16, wherein the cloud service component is configured to receive the document and the document-based workspace from a first computing device and provide the document and the document-based workspace to a second computing device such that the document-based workspace is maintained based on preserving transient data generated while editing the document on the first computing device.

* * * * *

UNITED STATES PATENT AND TRADEMARK OFFICE
CERTIFICATE OF CORRECTION

PATENT NO. : 10,387,552 B2  
APPLICATION NO. : 14/446036  
DATED : August 20, 2019  
INVENTOR(S) : Mansukh Patidar Page 1 of 1

It is certified that error appears in the above-identified patent and that said Letters Patent is hereby corrected as shown below:

In the Specification

Column 8, Line 48: Delete "that that" and insert -- that --, therefor.

Column 13, Line 5: Delete "that that" and insert -- that --, therefor.

Signed and Sealed this  
Nineteenth Day of November, 2019

Andrei Iancu  
*Director of the United States Patent and Trademark Office*